United States Patent
Kapadia et al.

(10) Patent No.: US 9,559,952 B2
(45) Date of Patent: Jan. 31, 2017

(54) ROUTING INTERNET PROTOCOL VERSION 6 LINK-LOCAL ADDRESSES IN A NETWORK ENVIRONMENT

(71) Applicant: CISCO TECHNOLOGY, INC., San Jose, CA (US)

(72) Inventors: Shyam Kapadia, Santa Clara, CA (US); Chengelpet V. Ramesh, San Jose, CA (US); Ming Zhang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 358 days.

(21) Appl. No.: 13/888,052

(22) Filed: May 6, 2013

(65) Prior Publication Data

US 2014/0328343 A1  Nov. 6, 2014

(51) Int. Cl.
*H04L 12/28* (2006.01)
*H04L 12/56* (2006.01)
*H04L 12/781* (2013.01)
*H04L 12/721* (2013.01)

(52) U.S. Cl.
CPC ............. *H04L 45/741* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 2008/0089334 A1* | 4/2008 | Soja-Molloy et al. | 370/392 |
| 2011/0317703 A1* | 12/2011 | Dunbar et al. | 370/392 |
| 2012/0151032 A1* | 6/2012 | Ciavattone | 709/224 |
| 2013/0010642 A1* | 1/2013 | Ullas | H04L 63/0272 370/254 |

OTHER PUBLICATIONS

Hinden, et al., "IP Version 6 Addressing Architecture," Internet Working Group, RFC 4291, Feb. 2006, 26 pages; http://www.ietf.org/rfc/rfc4291.txt.pdf.
Narten, et al., "Neighbor Discovery for IP version 6 (IPv6)," Network Working Group, RFC 4861, Sep. 2007, 97 pages; http://www.ietf.org/rfc/rfc4861.txt.pdf.
Thomson, et al., "IPv6 Stateless Address Autoconfiguration," Network Working Group, RFC 4862, Sep. 2007, 31 pages; http://www.ietf.org/rfc/rfc4862.txt.pdf.
Narten, et al., "Privacy Extensions for Stateless Address Autoconfiguration in IPv6," Network Working Group, RFC 4941, Sep. 2007, 24 pages; http://www.ietf.org/rfc/rfc4941.txt.pdf.

* cited by examiner

*Primary Examiner* — Ayaz Sheikh
*Assistant Examiner* — Sori Aga
(74) *Attorney, Agent, or Firm* — Patent Capital Group

(57) ABSTRACT

An example method for routing IPv6 link-local addresses in a network environment is provided and includes receiving a packet at a first switch from an attached first host in a virtual local area network (VLAN) associated with a virtual routing and forwarding (VRF) instance of a network environment, where the packet is destined to an Internet Protocol version 6 (IPv6) link-local address of a remote second host in the VLAN, and routing the packet at Layer 3 to a second switch, to which the second host is attached. In specific embodiments, the second switch routes the packet at Layer 3 to the second host if the VRF does not include duplicate IPv6 link-local addresses corresponding to the IPv6 link-local address of the second host; the second switch bridges the packet at Layer 2 to the second host if the VRF includes at least one duplicate IPv6 link-local address.

20 Claims, 8 Drawing Sheets

ROUTING INTERNET PROTOCOL VERSION 6 LINK-LOCAL ADDRESSES IN A NETWORK ENVIRONMENT

TECHNICAL FIELD

This disclosure relates in general to the field of communications and, more particularly, to routing Internet Protocol version 6 (IPv6) link-local addresses in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as appropriate, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for routing IPv6 link-local addresses in a network environment includes receiving a packet at a first switch from an attached first host in a virtual local area network (VLAN) associated with a virtual routing and forwarding (VRF) instance of a network environment, where the packet is destined to an IPv6 link-local address of a remote second host in the VLAN, and routing the packet at Layer 3 to a second switch, to which the second host is attached. In specific embodiments, the second switch routes the packet at Layer 3 to the second host if the VRF does not include duplicate IPv6 link-local addresses corresponding to the IPv6 link-local address of the second host; the second switch bridges the packet at Layer 2 to the second host if the VRF includes at least one duplicate IPv6 link-local address.

Example Embodiments

Figure 1:
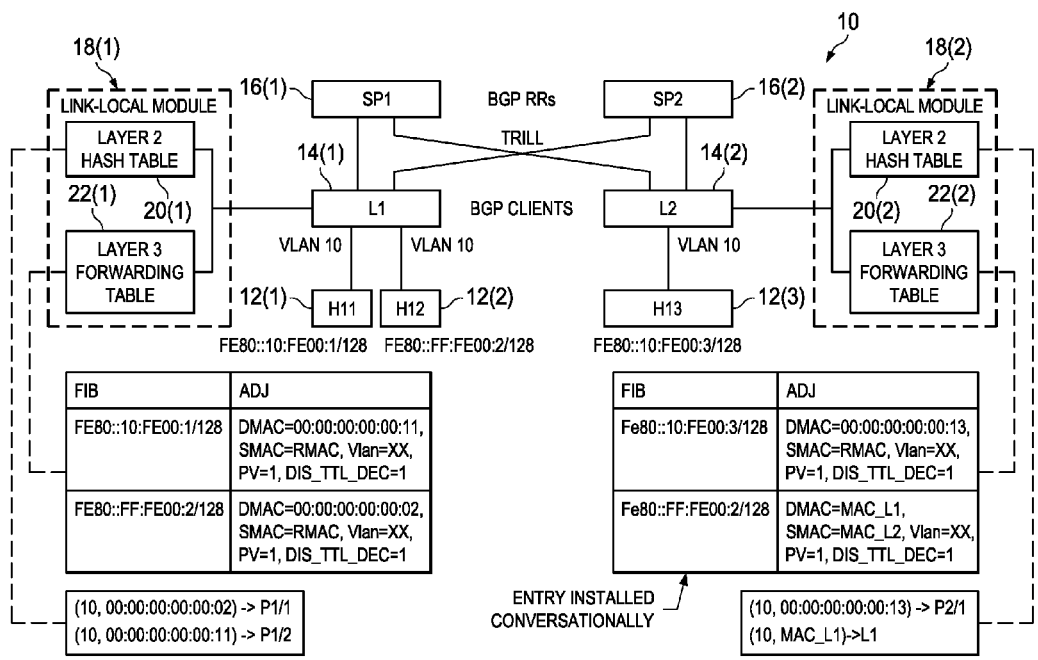
FIG. 1 is a simplified block diagram illustrating an example embodiment of a communication system for routing IPv6 link-local addresses in a network environment.

Turning to FIG. 1, FIG. 1 is a simplified block diagram illustrating an embodiment of communication system 10 for routing IPv6 link-local addresses in a network environment. Communication system 10 includes a plurality of hosts (e.g., 12(1)-12(3)) communicating (or communicable) over a plurality of switches (e.g., leaf switches 14(1), 14(2), and spine switches (e.g., 16(1), 16(2)) in an example network environment. The network architecture of FIG. 1 indicates merely as an example and not as a limitation, a Transparent Interconnection of Lots of Links (TRILL) network environment. Embodiments of communication system 10 may be implemented on any network architecture that can route packets in Layer 3 according to the broad scope of the present disclosure.

As used herein, the term "host" includes a computing device connected to a network. Examples of hosts include servers, laptops, desktops, and smartphones. Hosts may provide data, services, applications and other such information resources to users and other nodes (e.g., any electronic device, client, server, peer, service, application, or other object capable of sending, receiving, or forwarding information over communications channels) on the network.

As used herein, the term "switch" can include any network element configured to receive packets from a source (e.g., host 12(1)) and forward the packets appropriately to a destination (e.g., host 12(3)) in a network. Network elements can include computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

The example TRILL network architecture characterizes switches as leaf switches (e.g., 14(1), 14(2)) and spine switches (e.g., 16(1), 16(2)) merely to distinguish their respective connectivity. For example, leaf switches ((e.g., 14(1), 14(2)) connect directly to hosts (e.g., 12(1)-12(3) whereas spine switches (e.g., 16(1), 16(2)) connect to hosts (e.g., 12(1)-12(3)) exclusively through leaf switches (e.g., 14(1), 14(2)).

Each leaf switch (e.g., 14(1), 14(2)) may include a respective link-local module (e.g., 18(1), 18(2)), which includes a respective Layer 2 hash table (e.g., 20(1), 20(2)) and a Layer 3 forwarding table (e.g., 22(1), 22(2)). Each Layer 2 hash table (e.g., 20(1), 20(2)) can include an association between a virtual local area network (VLAN) (e.g., a logical partition of a network), a Media Access Control (MAC) address, and an egress port of the respective leaf switch (e.g., 14(1), 14(2)). For example, Layer 2 hash table 20(1) includes an association between VLAN 10, MAC address 00:00:00:00:00:02, and egress port P1/1. Any packet destined to the MAC address in the associated VLAN may be forwarded out through the associated egress port.

Each Layer 3 forwarding table (e.g., 22(1), 22(2)) can include an association between an Internet Protocol version 6 (IPv6) link-local addresses, a next-hop destination MAC address, a source MAC address, a Preserve VLAN (PV) bit, and a setting for time-to-live (TTL) (among other parameters). An initial look-up of the Layer 3 forwarding table (e.g., 22(1), 22(2)) may be based on an index key that includes the IP address (e.g., IPv6 link-local address); the result of the lookup may indicate the next-hop destination MAC address, and other details. For example, forwarding table 22(1) includes an association between IPv6 link-local address Fe80::10:FE00:1/128 and next-hop destination MAC address 00:00:00:00:00:11, a source MAC address (router MAC address), PV bit set to 1, and TTL disabled. Any packet destined to the IPv6 link-local address may be routed to the next-hop destination MAC address with the packet header rewritten accordingly. For example, the source address may be rewritten to the source MAC address, etc.

According to embodiments of communication system 10, flooding due to unknown unicast packets with IPv6 link-local addresses may be substantially eliminated. Scalability of handling IPv6 link-local addresses in the network environment may be improved by causing the leaf switches (e.g., 14(1), 14(2)) to proxy for the link-local neighbor discovery (ND) protocol messages and applying routing semantics in a manner similar to handling of IPv6 global addresses. Scalability may be maintained even when the topology becomes bigger with more network elements. The Layer 3 routing-based handling of IPv6 link-local addresses (as opposed to Layer 2 bridging) can be transparent to the hosts (e.g., 12(1)-12(3); no changes may be implemented on the end host stack, which may continue to see expected bridging behavior associated with link-local addresses. Troubleshooting can be facilitated because packets to unicast destinations may be routed on the leaf switches (e.g., 14(1), 14(2)), simplifying debug efforts.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Massive scale data centers (MSDCs) call for efficiency, scalability, mobility, agility (e.g., resource provisioning according to flexible demand), and any-to-any communication. Virtualization has played a key role in allowing server resources to be optimally utilized in MSDCs, providing efficiency, mobility, and agility. Accordingly, servers may be physical or virtual (e.g., virtual machines). Any-to-any communication may be achieved by implementing server blades arranged in pods in racks, which connect to one or more switches, called alternatively, access switches, leaf switches, or Top-of-rack (ToR) switches. The leaf switches are in-turn interconnected via a set of spine switches to facilitate a path for any-to-any communication between servers in the data center.

TRILL network architecture can improve scalability in such data center environments by eliminating floods due to Address Resolution Protocol (ARP) or Neighbor Discovery (ND) communication related to global Internet Protocol version 4 (IPv4) and IPv6 addresses, for example, by employing routing within a subnet (e.g., a logical partition of a network at Layer 3). An example implementation may resort to proxy ARP-like feature or proxy ND-like features. To optimally utilize hardware resources, such as host routing tables (HRTs) of hosts and forward information base (FIB) tables of leaf switches, conversational Layer 3 learning may be implemented to install certain entries in the FIB table of the leaf switches, where the entries correspond to hosts that are involved in an active conversation.

With IPv6, hosts are mandatorily assigned link-local addresses with prefix fe80::/10, typically in a stateless manner. As used herein, the term "link-local address" refers to an IPv6 address that is intended only for communication within a segment (e.g., logical partition, such as a VLAN) of a network. Consequently, routers (e.g., that connect a local area network (LAN) to a wide area network (WAN)) generally do not forward packets with link-local addresses. IPv6 uses a link-local address to be assigned to every network interface on which the IPv6 protocol is enabled, even when one or more routable addresses are also assigned. Consequently, IPv6 hosts usually have more than one IPv6 address assigned to each of their IPv6-enabled network interfaces. The type of address (e.g., whether multicast, link-local, global unicast, etc.) can be identified by a binary prefix, and the IPv6 notation. The link-local address is used for IPv6-based protocols, such as ND Protocol and Dynamic Host Configuration Protocol (DHCP). Link-local addresses are generally designed to be used for addressing on a single link for purposes such as automatic address configuration, neighbor discovery, or when no routers are present.

Link-local addresses may be assigned manually by an administrator or by operating system procedures. Stateless address auto-configuration may be performed according to certain standards (e.g., Internet Engineering Task Force (IETF) Request For Comments (RFC) 4862) by combining the routing prefix (fe80::/64) and the MAC address of the host interface. Uniqueness may be guaranteed automatically by the address selection methodology (e.g., MAC-address based according to RFC 4862, and/or randomized according to RFC 4941) in combination with the duplicate address detection (DaD) algorithms. Appropriate IPv6 DaD mechanisms typically ensure that the Link-local address is unique within the same VLAN and broadcast domain (BD). Each link-local address is limited to the VLAN and BD within which it exists; consequently, link-local addresses may be duplicated across VLANs and BDs in the network. Hosts can use link-local addresses to communicate in the same VLAN and BD.

In a typical scenario, IPv6 link-local addresses of hosts can be learnt through the ND protocol according to RFC 4861 (and updates or derivatives thereof). According to the ND protocol, a network node can send a Neighbor Solicitation (NS) message to other nodes in the network seeking a link-layer address of a neighboring node. Recipients of the NS message may respond with a Neighbor Advertisement (NA) message. Nodes accomplish address resolution by multicasting a NS message that asks the target node to return its link-layer (typically, MAC) address. NS messages are multicast to the solicited-node multicast address of the target address. The target node returns its link-layer address in a unicast NA message. A single request-response pair of packets is sufficient for both the initiator and the target to resolve each other's link-layer addresses as the initiator generally includes its link-layer address in the NS message.

In many networks (including TRILL networks), because IPv6 link-local addresses are limited in scope to each VLAN, and can also duplicate across different VLANs, bridging in hardware, rather than Layer 3 routing (based on IP addresses) has been historically implemented for forwarding packets destined to IPv6 link-local addresses. Bridging involves segmentation of LANs at the Layer 2 level into VLANs or broadcast domains. Layer 2 bridging cannot permit communication of network elements across different VLANs. A multiport bridge (e.g., Layer 2 switch) typically learns about the MAC addresses on each of its ports and transparently passes MAC frames destined to those ports.

Thus, any unknown unicast IPv6 link-local address can be flooded to all ports/hosts within a particular VLAN. In a TRILL network, flooding may be worse when optimal pruning has not been enabled on the spine switches, so that the packet is flooded to potentially all switches in the network. Such flooding can present a scale limitation, for example, as the proliferation of IPv6 usage in data centers goes up with dual-stacked servers becoming increasingly popular.

Communication system 10 is configured to address these issues (and others) in offering a system and method for routing link-local addresses in a network environment. According to embodiments of communication system 10, leaf switches (e.g., 14(2)) can trap a NS message from a directly attached host (e.g., 12(3)) in a specific VLAN (e.g., VLAN 10) requesting the IPv6 link-local address of another host (e.g., 12(2)) in the same VLAN. Instead of flooding the NS message to all ports, the leaf switch (e.g., 14(2)) may store the requesting host's IPv6 link-local address (e.g., FE80::10:FE00:1/128) in a host database in its control plane. In some embodiments, the leaf switch (e.g., 14(2)) may learn the IPv6 link-local addresses and VLANs of directly attached hosts (e.g., 12(3)) through other mechanisms (e.g., snooping), or when the hosts (e.g., 12(3)) are initially activated in the network.

The leaf switch (e.g., 14(2)) may advertise the IPv6 link-local addresses (e.g., FE80::10:FE00:3/128) and the VLAN (e.g., VLAN 10) of directly attached hosts (e.g., 12(3)) to substantially all other leaf switches (e.g., 14(1)) in the network environment. In various embodiments, the advertisements to the other leaf switches (e.g., 14(1)) may be according to suitable protocols, such as the internal Border Gateway Protocol (iBGP) or Locator/ID Separation Protocol (LISP), with the spine switches (e.g., 16(1), 16(2)) acting as iBGP route reflectors (RRs) and leaf switches (e.g., 14(1), 14(2)) acting as iBGP clients. In this way, substantially all leaf switches (e.g., 14(1), 14(2)) can be aware of substantially all host addresses in the spine-leaf cluster.

The host database may include the IPv6 link-local addresses of substantially all hosts associated with the virtual routing and forwarding (VRF) instance associated with the VLANs, and may be populated based on information received from substantially all hosts (e.g., 12(3) directly attached to the leaf switch (e.g., 14(2)) and from substantially all other leaf switches (e.g., 14(1)) in the network environment. VRF enables multiple instances of a routing table (e.g., hash table, FIB table) to co-exist within the same switch at the same time. Because the routing instances are independent, the same or overlapping IP addresses can be used without conflicting with each other. Note that different VLANS within the same VRF can have the same IPv6 link-local address (for example, because MAC addresses are expected to be unique only within a VLAN, and not across VLANs). The leaf switch (e.g., 14(2)) may organize the host database according to the VRF instance, the IPv6 link-local addresses and VLANs.

The leaf switch (e.g., 14(2)) may lookup the host database and may determine if there is at least one other IPv6 link-local address in the host database that is identical to the IPv6 link-local address of the target host (e.g., 12(2)). If a match is found in the host database lookup, the leaf switch (e.g., 14(2)) may proxy for the target host (e.g., 12(2)) with a NA message including the leaf switch's own router MAC address (in addition to the IPv6 link-local address, in some embodiments).

On the one hand, if there is merely a single IPv6 link-local address in the host database that is identical to the IPv6 link-local address of the target host (e.g., 12(2)) (e.g., there are no duplicate IPv6 link-local addresses in the host database), the MAC address of the destination leaf switch (e.g., 14(1)) to which the target host (e.g., 12(2)) is connected may be written into the appropriate destination MAC address field in the Layer 3 forwarding table (e.g., 22(2)). On the other hand, if there is at least one other IPv6 link-local address in the host database that is identical to the IPv6 link-local address of the target host (e.g., 12(2)) (e.g., there are duplicate IPv6 link-local addresses in the host database), the MAC address of the destination host (e.g., 12(2)) may be written into the target host's (e.g., 12(2)) destination MAC address field in the Layer 3 forwarding table (e.g., 22(2)).

In anticipation of a connection between the requesting host (e.g., 12(3)) and the target host (e.g., 12(2)), leaf switch (e.g., 14(2)) may install the IPv6 link-local address of the target host (e.g., 12(2)) in its Layer 3 forwarding table (e.g., 22(2)). Aging semantics can apply to IPv6 link-local entries in the same way that it applies to other FIB entries (e.g., age out entries for inactive flows). The entry, entered conversationally (e.g., because of a potential active flow) may include the MAC address of the leaf switch (e.g., 14(1)) directly attached to the target host (e.g., 12(2)) as the destination MAC (DMAC) address, the router MAC address of the leaf switch (e.g., 14(2)) as the source MAC (SMAC) address, and may set a preserve VLAN (PV) to 1, and set a Time-To-Live (TTL) decrement to be disabled.

TTL decrement may be disabled for packets communicating between link-local addresses. TTL (also called hop limit) is a mechanism that limits the lifetime of packets in a network. TTL may be implemented as a counter or timestamp attached to or embedded in the packet. After the prescribed event count or time span has elapsed, the data is discarded. In computer networking, TTL prevents a packet from circulating indefinitely. The TTL value may act as an upper bound on the time that the packet can exist in the network. The TTL field is typically set by the sender of the packet, and decremented (e.g., reduced) by every router (e.g., network element that forwards packets using Layer 3 forwarding) on the route to its destination. According to various embodiments, the TTL decrement field of IPv6 link-local addresses installed in forwarding tables (e.g., 22(2)) can be set as disabled, according to IPv6 link-local address standards.

The PV bit may be set to 1 in some embodiments to indicate that the egress VLAN may be set to the ingress VLAN. As used herein, the term "egress VLAN" refers to the VLAN associated with the destination host; the term "ingress VLAN" refers to the VLAN associated with the source host. In some embodiments, the PV bit may be set to 1 for substantially all IPv6 link-local addresses entered in the Layer 3 forwarding table. In a general sense, the PV bit may be set when IPv6 link-local addresses are installed in the respective forwarding tables (e.g., 22(1) and 22(2)).

Even though a packet can be subjected to routing semantics such as SMAC rewrite, DMAC rewrite, etc., the egress VLAN may be elected to be the same as the ingress VLAN according to the setting of the PV bit. The post Layer 3-Layer 2 lookup can be based on the <ingress-VLAN, DMAC> tuple in many embodiments. With TRILL network architecture, which uses an overlay, the Layer 2 lookup on the ingress switch (e.g., 14(2)) can yield the egress switch (e.g., 14(1)) to which the packet may be forwarded; on the egress switch (e.g., 14(1)), the Layer 2 lookup can yield the port along which the packet may be sent out.

With the PV bit set appropriately, although two hosts in different VLANs can share the same MAC address, and thus also share the same link-local address, installing the adjacency/next-hop information appropriately can ensure that routing of link-local addresses operates smoothly. A corresponding entry may be added in the Layer 2 hash table (e.g., 20(2)), including the VLAN (e.g., 10), the DMAC (e.g., MAC_L1) from the Layer 3 forwarding table (e.g., 22(2)) and the associated egress port (e.g., port facing L1).

Subsequently, the leaf switch (e.g., 14(2)) may receive a packet from the requesting host (e.g., 14(3)) destined to the IPv6 link-local address (e.g., FE80::FF:FE00:2/128) of the target host (e.g., 14(2)). Based on the value of the PV bit (e.g., 1) in the Layer 3 forwarding table (e.g., 22(2)), the egress VLAN may be set to the ingress VLAN (e.g., VLAN 10 of the packet source, namely VLAN 10). The lookup of the Layer 3 forwarding table (e.g., 22(2)) may also indicate the next-hop MAC address (e.g., MAC_L1) corresponding to the IPv6 link-local address. A lookup of the Layer 2 hash table (e.g., 20(2)) may indicate the egress port (e.g., L1) through which to forward the packet so that it can reach the target host (e.g., 14(2)). The packet header may be rewritten according to the source and destination MAC addresses in the Layer 3 forwarding table (e.g., 22(2)) and the packet may be forwarded to the target leaf switch (e.g., 14(1)) without decrementing TTL (as the TTL decrement is set to disabled in the Layer 3 forwarding table).

When the target leaf switch (e.g., 14(1)) receives the packet, it looks up the Layer 3 forwarding table (e.g., 22(1)), sets the egress VLAN to be the same as the ingress VLAN (e.g., VLAN 10) and determines the destination MAC address (e.g., 00:00:00:00:00:02). The leaf switch (e.g., 14(1)) looks up the Layer 2 hash table (e.g., 20(1)) and determines the egress port (e.g., P1/2) associated with the MAC address. The packet may be forwarded to the target host (e.g., 12(2)) through the egress port (e.g., P1/2), without decrementing TTL. The receiving host (e.g., 12(2)) perceives the packet to be bridged, rather than routed, based on the TTL not being decremented.

In various embodiments, floods generated by IPv6 link-local communication may be eliminated by facilitating handling link-local communication in a manner similar to global addresses (e.g., IPv4 and IPv6 addresses). According to various embodiments, substantially all ND packets from a particular host (e.g., 12(1)) are terminated on the directly attached leaf switch (e.g., 14(1)). The ND packets can include Neighbor Solicitation (NS) packets and Neighbor Advertisement (NA) packets for link-local and global addresses. NS packets from the hosts (e.g., 12(1)) may be trapped at the directly attached leaf switch (e.g., 14(1)), and redirected to a processor in the leaf switch (e.g. 14(1)), allowing discovery of the IPv6 link-local address associated with the requesting host (e.g., 12(1)).

In typical TRILL architecture, packets are generally sent towards the fabric with an overlay header, which includes an explicit TTL field. According to various embodiments, if a multi-destination (e.g., multicast, broadcast) packet is received from a spine switch (e.g., 16(1), 16(2)), and the multi-destination packet has to be sent back to the spine switch based on a routing decision according to an appropriate multi-destination tree (e.g., as identified by an FTag identifier), the TTL for the multi-destination packet can be decremented, for example, to avoid non-convergence.

According to various embodiments, an incoming packet from one of the spine switches (e.g., 16(1), 16(2)) with an outer destination address including the spine switch's own switch identifier (e.g., RBridge ID) may be decapsulated. If the packet is a Layer 2 packet, then it may not be sent back towards the spine switches (e.g., 16(1), 16(2)). If the packet undergoes a Layer 3 rewrite, then it may be sent back towards the spine switches (e.g., 16(1), 16(2)) depending on the Layer 3-Layer 2 lookup. In some embodiments, an egress access control list (ACL) may be used for link-local addresses, for example, to ensure that incoming packets from spine switches (e.g., 16(1), 16(2)) with a destination address including IPv6 link-local addresses are not sent back to the spine switches (e.g., 16(1), 16(2)). The TTL from the incoming packet may be retained, decremented, and the packet may be sent back to the core (e.g., towards the spine switches (e.g., 16(1), 16(2)). In some embodiments, where hosts are moved within or across VLANs, the packets may be sub-optimally forwarded to the moved host's IPv6 link-local address until the control-plane converges.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of switches and hosts, interconnected in any suitable network architecture, within the broad scope of the present disclosure.

The example network environment may be configured over a physical infrastructure that may include one or more networks and, further, may be configured in any form including, but not limited to, LANs, wireless local area networks (WLANs), VLANs, metropolitan area networks (MANs), WANs, virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). The network may represent any type of network, including Internet, enterprise networks, data center networks, cloud networks, etc.

In various embodiments, the link-local modules (e.g., 18(1), 18(2)) may be implemented as a combination of hardware and software in the respective leaf switches (e.g., 14(1), 14(2)). In some embodiments, the link-local modules (e.g., 18(1), 18(2)) may be implemented exclusively as hardware, and in some other embodiments, the link-local modules (e.g., 18(1), 18(2)) may be implemented exclusively as software. The hash tables (e.g., 20(1), 20(2)) and forwarding tables (e.g., 22(1), 22(2)) may be implemented as any suitable data storage element, including tables, databases, etc., based on appropriate hardware configuration of the respective leaf switches (e.g., 14(1), 14(2)).

Figure 2:
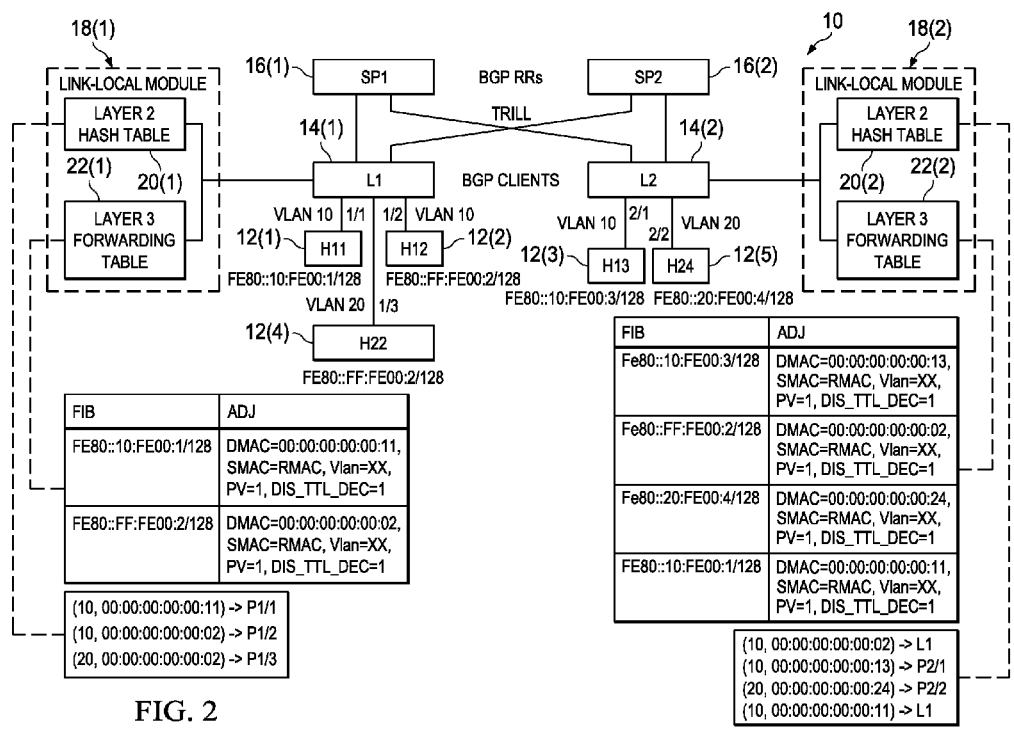
FIG. 2 is a simplified block diagram illustrating example details of another embodiment of the communication system.

Turning to FIG. 2, FIG. 2 is a simplified block diagram illustrating another example embodiment of communication system 10. Assume, merely for the sake of illustration, and not as a limitation, that hosts 12(1)-12(3) are in a first VLAN (e.g., VLAN 10), and hosts 12(4)-12(5) are in a second VLAN (e.g., VLAN 20). Assume that host 12(4) in VLAN 20 shares the same MAC address as host 12(2) in VLAN 10. Consequently, hosts 12(2) and 12(4) share the same IPv6 link-local address (e.g., FE80::FF:FE00:2/128).

When hosts 12(2) and 12(4) are activated (e.g., comes up, turns on, etc.), directly attached leaf switch (e.g., 14(1)) may learn their IPv6 link-local addresses and populate the host database with the VRF, IPv6 link-local addresses and VLANs. Consequently, the host database may indicate duplicate IPv6 link-local addresses (e.g., belonging to two separate VLANS in the same VRF). The IPv6 link-local address may be installed in the Layer 3 forwarding table (e.g., 22(1)) of leaf switch 14(1), corresponding to both hosts 12(2) and 12(4). The Layer 2 hash table 20(1) of leaf switch 14(1) may include the respective, different VLANs to which hosts 12(2) and 12(4) belong. The IPv6 link-local addresses and VLAN information may be advertised to other leaf switches (e.g., 14(2)) using a suitable protocol (e.g., iBGP, LISP, etc.). Other leaf switches (e.g., 14(2)) may populate their respective host databases with the advertised information.

Assume, merely for example purposes, and not as a limitation, that host 12(3) initiates communication with host 12(2) in the same VLAN using the IPv6 link-local address. When directly attached leaf switch 14(2) receives an NS packet from host 12(3), it installs the IPv6 link-local address of target host 12(2) in its Layer 3 forwarding table 22(2) in anticipation of a potential conversation between host 12(3) and host 12(2). Leaf switch 14(2) may respond (e.g., proxy) with a NA message including the leaf switch's MAC address on behalf of target host 12(2). Because there are duplicate IPv6 link-local addresses belonging to separate VLANs, the MAC address of target host 12(2) may be installed in the destination MAC address field of Layer 3 forwarding table 22(2). A corresponding entry for the MAC address of target host 12(2) in Layer 2 hash table 20(2) may point to the port facing the leaf switch (e.g., 14(1)) directly attached to the target host 12(2). Subsequently, the packet from host 12(3) may be routed to leaf switch 14(1) with TTL decrement disabled.

Leaf switch 14(1) may receive the packet destined to the IPv6 link-local address of host 12(2). The Layer 3 forwarding table 22(1) may indicate a single entry corresponding to the IPv6 link-local address. However, since the incoming packet is a Layer 2 packet, a simple bridging lookup on leaf switch 14(1) based on the VLAN and destination MAC address (e.g., VLAN=10, DMAC=00:00:00:00:00:02) may ensure that the packet is forwarded to host 12(2) on egress port P1/2. Since the DMAC field of the packet was re-written at the ingress leaf switch (e.g., 14(2)), a bridging lookup may be sufficient at the egress leaf switch (e.g., 14(1)) for scenarios with duplicate IPv6 link-local addresses in the host database. Thus, with duplicate IPv6 link-local addresses, the packet may be routed (e.g., at Layer 3) at the ingress leaf switch (e.g., 14(2)) and bridged (e.g., at Layer 2) at the egress leaf switch (e.g., 14(1)).

Assume, merely for example purposes, and not as a limitation, that host 12(3) initiates communication with host 12(1) in the same VLAN (e.g., VLAN 10) using the IPv6 link-local address. When directly attached leaf switch 14(2) receives an NS packet from host 12(3), it installs the IPv6 link-local address of target host 12(1) in its Layer 3 forwarding table 22(2) in anticipation of a potential conversation between host 12(3) and host 12(1). Leaf switch 14(2) may respond (e.g., proxy) with a NA message including the leaf switch's MAC address on behalf of target host 12(1). Because there are no duplicate IPv6 link-local addresses belonging to separate VLANs, the MAC address of leaf switch 14(1) directly attached to destination host 12(1) may be installed in the destination MAC address field of Layer 3 forwarding table 22(2). A corresponding entry for the MAC address of target host 12(1) in Layer 2 hash table 20(2) may point to the port facing the leaf switch (e.g., 14(1)) directly attached to the target host 12(1). Subsequently, the packet from host 12(3) may be routed to leaf switch 14(1) with TTL decrement disabled.

Leaf switch 14(1) may receive the packet, destined to the IPv6 link-local address of host 12(1). The Layer 3 forwarding table 22(1) may indicate a single entry corresponding to the IPv6 link-local address. The egress VLAN may be set to the ingress VLAN (namely, VLAN 10) based on the value of the PV bit. A lookup for the egress VLAN in Layer 2 hash table 20(1) may indicate an egress port of P1/1 corresponding to VLAN 10 and MAC address of 00:00:00:00:00:11. The TTL decrement may be disabled and the packet may be routed to host 12(1). Thus, with no duplicate IPv6 link-local addresses, the packet may be routed (e.g., at Layer 3) at both the ingress leaf switch (e.g., 14(2)) and the egress leaf switch (e.g., 14(1)).

Figure 3:
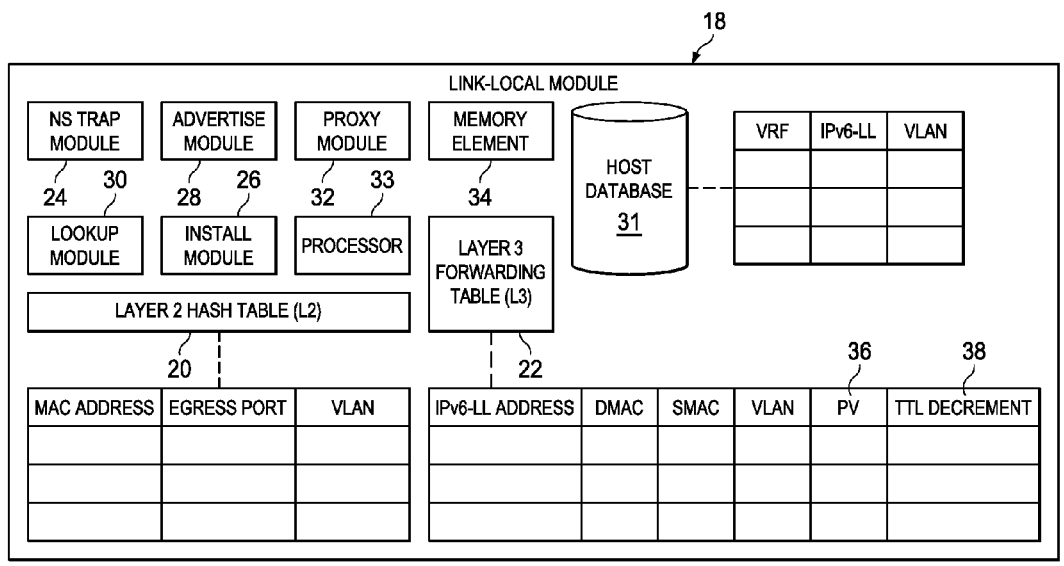
FIG. 3 is a simplified block diagram illustrating example details of an embodiment of the communication system.

Turning to FIG. 3, FIG. 3 is a simplified block diagram illustrating certain details of an example link-local module 18 according to embodiments of communication system 10. Example link-local module 18 may include an NS trap module 24, an install module 26, an advertise module 28, a lookup module 30, a host database 31, a proxy module 32, a processor 33, and a memory element 34, in addition to an example Layer 3 forwarding table 22 and an example Layer 2 hash table 20. In some embodiments, host database 31 may be implemented in a control plane of the associated leaf switch in which link-local module 18 executes. Host database 31 may include, merely by way of examples, and not as limitations, the VRF instance, IPv6 link-local addresses and VLANs configured in the corresponding VRF instance. Host database 31 may be searchable according to one or more of VRF instance, IPv6 link-local addresses, and VLANs. In some embodiments, host database 31 may be implemented in software; and Layer 2 hash table 20 and Layer 3 forwarding table 22 may be implemented in hardware (e.g., in an Application Specific Integrated Circuit (ASIC)).

Example Layer 3 forwarding table 22 may include, by way of examples, and not as limitations, IPv6 link-local address, next-hop destination MAC address, source MAC address, VLAN, PV bit 36 and a setting of TTL decrement 38. According to various embodiments of communication system 10, PV bit 36 may be set to 1 to indicate that the egress VLAN for the entry may be set to be the same as the ingress VLAN associated with the packet's source host. TTL decrement 38 may be disabled, for example, so that packets appear bridged in Layer 2 rather than routed in Layer 3. Example Layer 2 hash table may include, by way of examples, and not as limitations, the MAC address corresponding to the destination MAC address in Layer 3 forwarding table 20, the egress port and VLAN associated with the MAC address. Memory element 34 may facilitate the operations described herein.

During operation, NS trap module 24 may trap NS messages from directly attached hosts and redirect them to processor 33. The VRF instance, IPv6 link-local address and VLAN of the requesting hosts may be entered into host database 31. Advertise module 28 may advertise the information stored in host database 31 to other leaf switches in the network. Install module 26 may install each IPv6 link-local address of the directly attached leaf switches in Layer 3 forwarding table 22. For each entry, the DMAC field may be set to the MAC address of the requesting host, the SMAC field may be set to the router MAC address, the VLAN may be set appropriately, PV bit 36 may be set to 1 (e.g., to indicate that the egress VLAN is the same as the ingress VLAN) and TTL decrement 38 may be disabled. An entry may be installed in Layer 2 hash table 20 corresponding to the value of the DMAC field set in Layer 3 forwarding table 22.

When a directly attached host initiates communication with a remote host, an initial NS message may be sent requesting the IPv6 link-local address to MAC binding of the remote host. NS trap module 24 may trap the NS message and redirect to processor 33. Lookup module 30 may lookup host database 31 and determine if a match is found therein. If a match is found, link-local module 18 may cause the leaf switch to respond with a NA message including the leaf switch's router MAC address as the next-hop destination MAC address. In anticipation of traffic between the requesting host and the remote target host, install module 26 may install the IPv6 link-local address of the remote target host in Layer 3 forwarding table 22. The SMAC field may be set to the router MAC address, the VLAN may be set appropriately, PV bit 36 may be set to 1 (e.g., to indicate that the egress VLAN is the same as the ingress VLAN) and TTL decrement 38 may be disabled. If a match is not found in host database 31, no NA message may be sent back in response.

Lookup module 30 may also determine if there are duplicate IPv6 link-local addresses in host database 31. For example, two distinct VLANs in any one VRF may include different hosts having the same IPv6 link-local address. Further action by link-local module 18 may depend on a finding of a duplicate IP v6 link-local address. If no duplicate IPv6 link-local addresses are found, install module 26 may install the router MAC address of the leaf switch directly attached to the target host in the DMAC field of Layer 3 forwarding table 22. On the other hand, if a duplicate IPv6 link-local address is found, install module 26 may install the MAC address of the target host in the DMAC field of Layer 3 forwarding table 22, so that a bridging lookup at Layer 2 may be sufficient at the egress leaf switch.

In either scenario, an entry may be installed in Layer 2 hash table 20 corresponding to the value of the DMAC field set in Layer 3 forwarding table 22. For example, the egress port entered in Layer 2 hash table 20 may correspond to the port facing the spine switches. When a subsequent packet destined to the IPv6 link-local address of the remote target host is received at the leaf switch, lookup module 30 may look up Layer 3 forwarding table 22, set the egress VLAN to the ingress VLAN based on the PV bit, derive the DMAC value, lookup Layer 2 hash table 20 for the corresponding entry, get the egress port, and forward the packet through the egress port.

Figure 4:
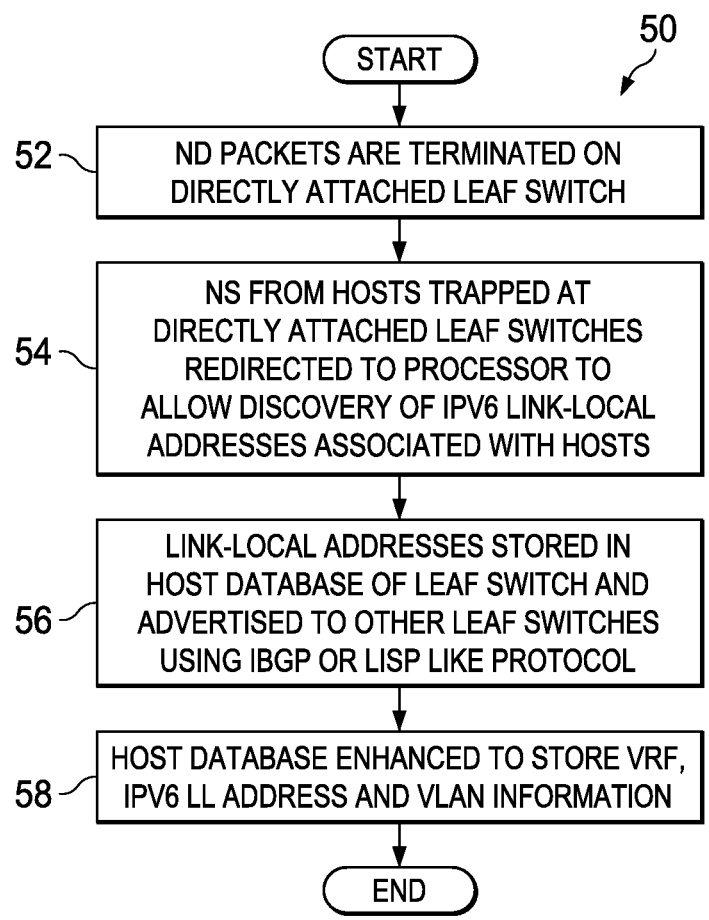
FIG. 4 is a simplified flow diagram illustrating potential operations that may be associated with an embodiment of the communication system.

Turning to FIG. 4, FIG. 4 is a simplified flow diagram illustrating example operations 50 that may be associated with embodiments of communication system 10. At 52, ND packets from hosts (e.g., 12(1), 12(2)) are terminated on a directly attached leaf switch (e.g., 14(1)). At 54, NS messages from hosts are trapped at the directly attached leaf switch (e.g., 14(1)) and redirected to a processor to allow discovery of the requesting hosts' IPv6 link-local addresses. At 54, the IPv6 link-local addresses are stored in a host database of the leaf switch (e.g., 14(1)) and advertised to other leaf switches using a suitable protocol such as iBGP or LISP like protocol. At 58, the host database is enhanced to store the VLAN information in addition to the VRF and IPv6 link-local addresses.

Figure 5:
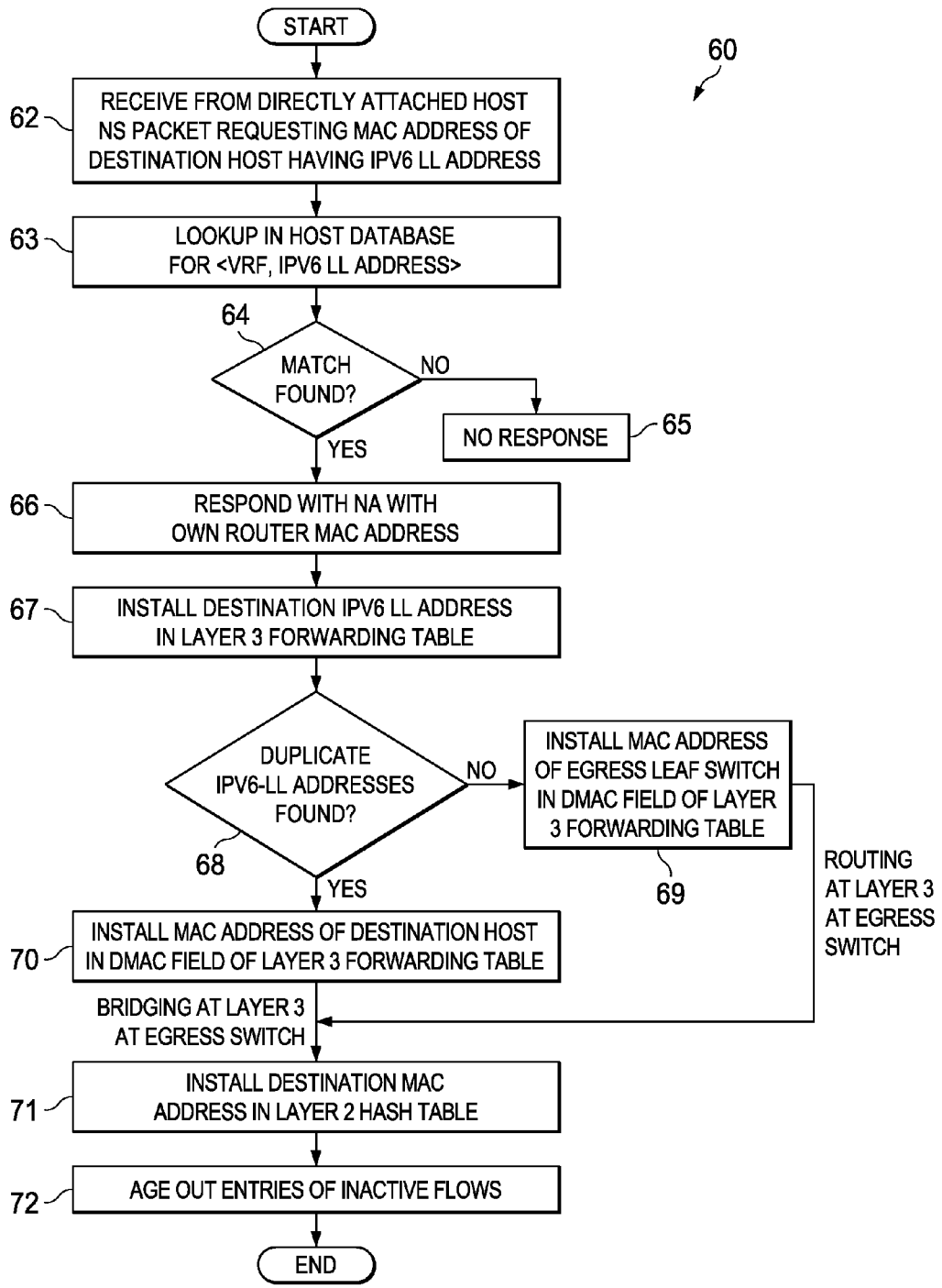
FIG. 5 is a simplified flow diagram illustrating other potential operations that may be associated with an embodiment of the communication system.

Turning to FIG. 5, FIG. 5 is a simplified flow diagram illustrating example operations 60 that may be associated with embodiments of communication system 10. At 62, a leaf switch (e.g., 14(1)) may receive from a directly attached host (e.g., 12(1)) a NS packet requesting the IPv6 to MAC binding of a destination host (e.g., 12(3)) having a particular IPv6 link-local address. Alternatively, or additionally, the NS packet may request the IPv6 link-local address of the destination host (e.g., 12(3)). At 63, link-local module (e.g., 18(1)) may look up in its host database for the specific combination of VRF and IPv6 link-local address. At 64, a determination may be made if the IPv6 address is found in the host database. If not found, at 65, no response may be sent back to the requesting host. If a match is found, at 66, link-local module (e.g., 18(1)) may cause the leaf switch (e.g., 14(1)) to respond with a NA message with its own router MAC address. At 67, the destination IPv6 link-local address of the destination host (e.g., 12(3)) may be installed in the Layer 3 forwarding table (e.g., 22(1)) of the leaf switch (e.g., 14(1)).

At 68, a determination may be made whether there are duplicate IPv6 link-local addresses (e.g., in different VLANs) in the host database. If there are no duplicate IPv6 link-local addresses in the host database, at 69, the leaf switch (e.g., 14(1)) may install the MAC address of the egress leaf switch (e.g., 14(2)) that is directly attached to the target host (e.g., 12(3)) in the DMAC field of the Layer 3 forwarding table (e.g., 22(1)). Thus, the packet may get routed at Layer 3 at the egress switch, as the egress switch (e.g., 14(2)) may have to lookup its Layer 3 forwarding table, and determine the next-hop MAC address of the destination host (e.g., 12(3)), then lookup its Layer 2 hash table, and forward the packet out of the egress port determined from the Layer 2 hash table.

On the other hand, if there is at least one duplicate IPv6 link-local address in the host database, at 70, the leaf switch (e.g., 14(1)) may install the destination MAC address of the destination host (e.g., 12(3)) in the DMAC field of the Layer 3 forwarding table (e.g., 22(1)). Thus, the packet may be bridged at Layer 2 at the egress switch, as the egress switch (e.g., 14(1)) may simply look up its Layer 2 hash table to determine the egress port through which to forward the packet. At 71, the destination MAC address may be installed in the Layer 2 hash table (e.g., 20(1)) of the leaf switch (e.g., 14(1)). At 73, entries belonging to inactive flows (e.g., between hosts that are no longer communicating with each other) may be aged out according to any suitable aging criteria, based on user configurations. Thus, according to embodiments of communication system 10, the packet may be routed at Layer 3 (e.g., with associated destination and source MAC rewrites) at the ingress switch even when the packet is destined to an IPv6 link-local address.

Figure 6:
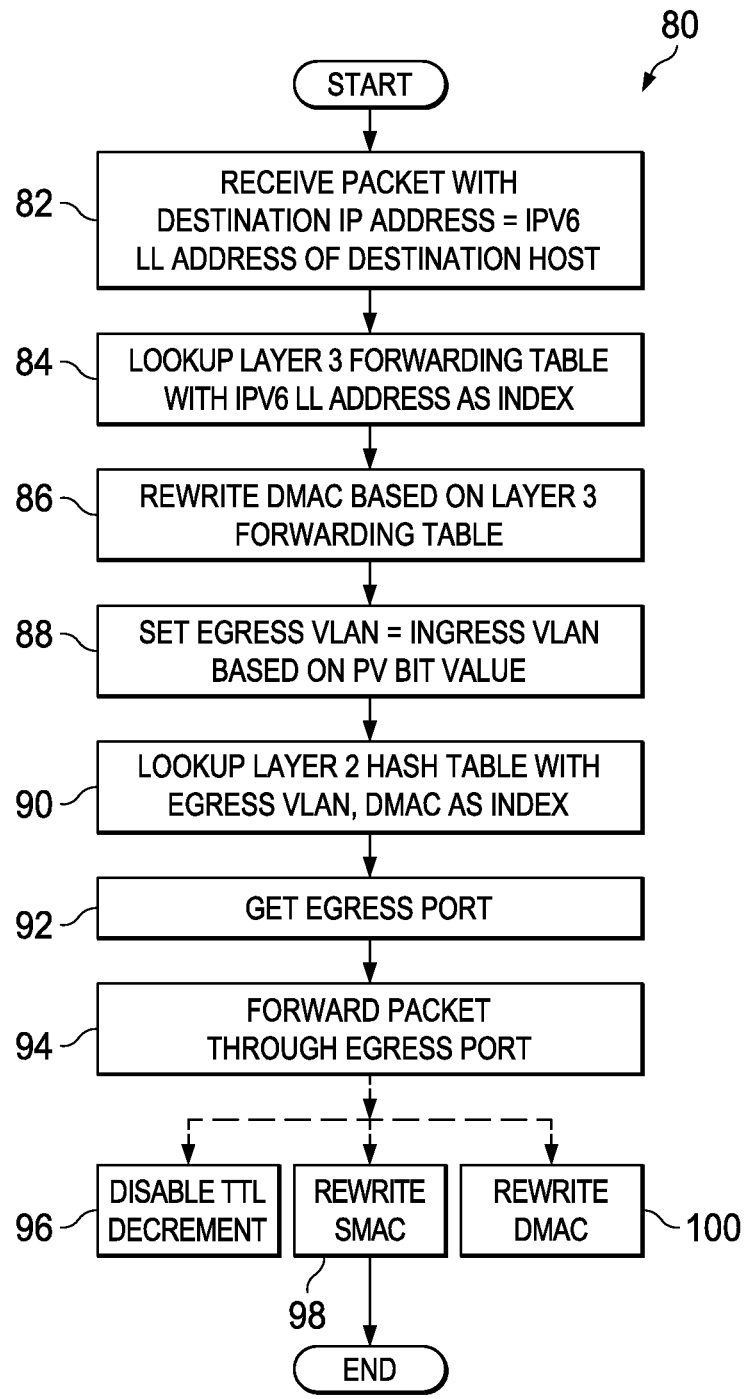
FIG. 6 is a simplified flow diagram illustrating yet potential operations that may be associated with an embodiment of the communication system.

Turning to FIG. 6, FIG. 6 is a simplified flow diagram illustrating example operations 80 that may be associated with embodiments of communication system 10. At 82, a packet with a destination IP address including an IPv6 link-local address of a destination host may be received at a leaf switch (e.g., 14(1)). At 84, the link-local module (e.g., 18(1)) of the leaf switch (e.g., 14(1)) may lookup its Layer 3 forwarding table (e.g., 22(1)) with the destination IPv6 link-local address as the index. At 86, the destination MAC address in a header of the packet may be rewritten based on the value of the DMAC field in the Layer 3 forwarding table (e.g., 22(1)). At 88, based on the value of the PV bit in the Layer 3 forwarding table (e.g., 22(1)), the egress VLAN may be set to the ingress VLAN. At 90, the Layer 2 forwarding table (e.g., 20(1)) may be looked up with the egress VLAN, DMAC as the index. At 92, the corresponding egress port may be determined from the Layer 2 hash table (e.g., 20(1)). At 94, the packet may be forwarded out through the egress port. Operation 94 may include 96, at which the TTL decrement may be disabled; 98 at which the source MAC address (SMAC) in the packet header may be rewritten based on the entry in the Layer 3 forwarding table (e.g., 22(1)); and 100, at which the DMAC in the packet header may be rewritten based on the entry in the Layer 3 forwarding table (e.g., 22(1)).

Figure 7:
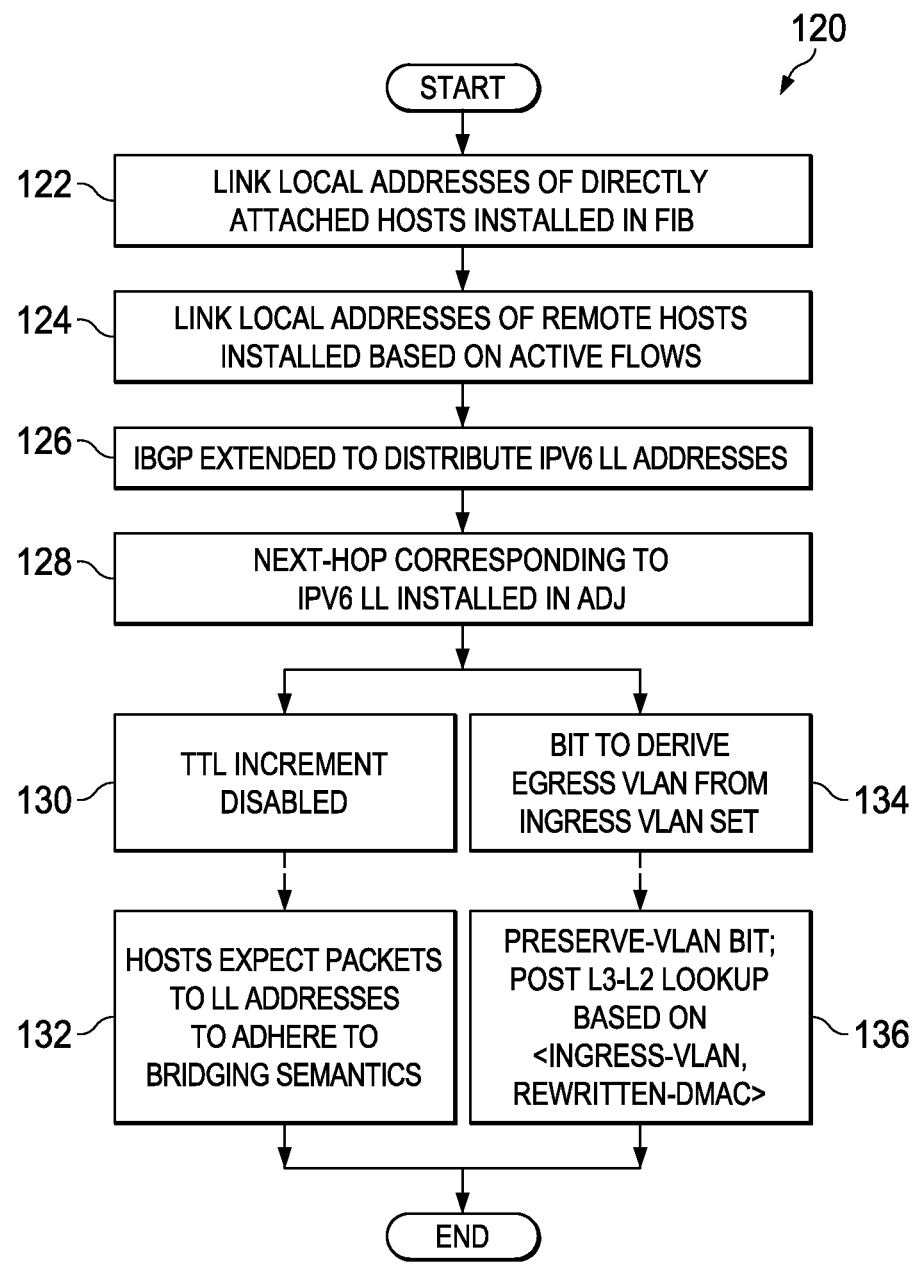
FIG. 7 is a simplified flow diagram illustrating yet potential operations that may be associated with an embodiment of the communication system.

Turning to FIG. 7, FIG. 7 is a simplified flow diagram illustrating example operations 120 that may be associated with embodiments of communication system 10. At 122, the IPv6 link-local addresses of directly attached hosts (e.g., 12(1), 12(2)) may be installed in the Forward Information Base (FIB) field of the Layer 3 forwarding table (e.g., 22(1)) of the associated leaf switch (e.g., 14(1)). At 124, the IPv6 link-local addresses of remote hosts (e.g., 12(3)) may be installed conversationally (e.g., based on active flows). At 126, iBGP may be extended to distribute IPv6 link-local addresses, in addition to VRF and VLAN information. At 128, the next-hop corresponding to the IPv6 link-local addresses may be installed in the Adjacency (ADJ) field of the Layer 3 forwarding table (e.g., 22(1)). At 130, the TTL increment (or decrement) may be disabled. Operation 128 may include 132, at which hosts may expect packets destined to IPv6 link-local addresses to adhere to bridging semantics. Operation 128 may include 134, at which the PV bit to derive egress VLAN from the ingress VLAN may be set (e.g., to 1) At 136, the Layer 2 lookup port Layer 3 may be based on <ingress VLAN, rewritten DMAC> to determined the egress port.

Figure 8:
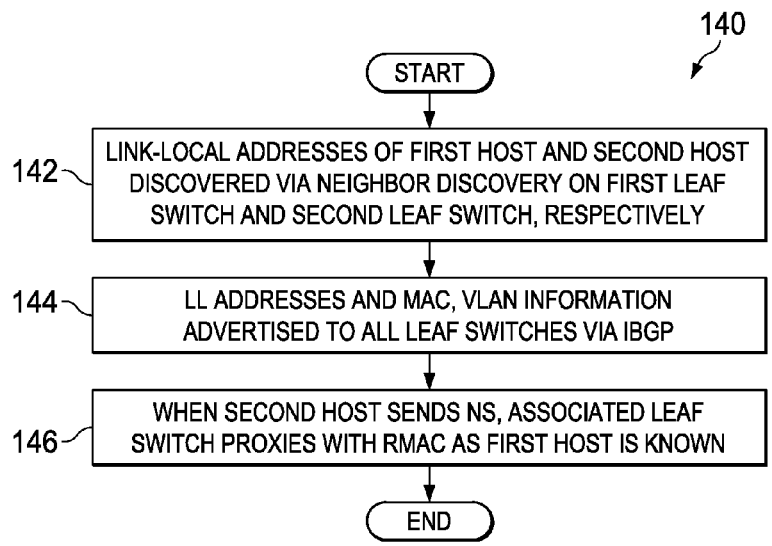
FIG. 8 is a simplified flow diagram illustrating yet potential operations that may be associated with an embodiment of the communication system.

Turning to FIG. 8, FIG. 8 is a simplified flow diagram illustrating example operations 140 that may be associated with embodiments of communication system 10. At 142, the IPv6 link-local address of a first host (e.g., 12(1)) and a second host (e.g., 12(3)) may be discovered via ND protocol on a first leaf switch (e.g., 14(1)) and a second leaf switch (e.g., 14(2)), respectively. At 144, the IPv6 link-local addresses may be advertised to substantially all leaf switches using iBGP (or LISP, or such similar protocols). Thus, for example, leaf switch 14(2) learns the IPv6 link-local address of the first host (e.g., 12(1). At 146, when the second host (e.g., 14(3)) sends a NS message, the associated leaf switch (e.g., 14(2)) may proxy with the router MAC, as the first host is known.

Figure 9:
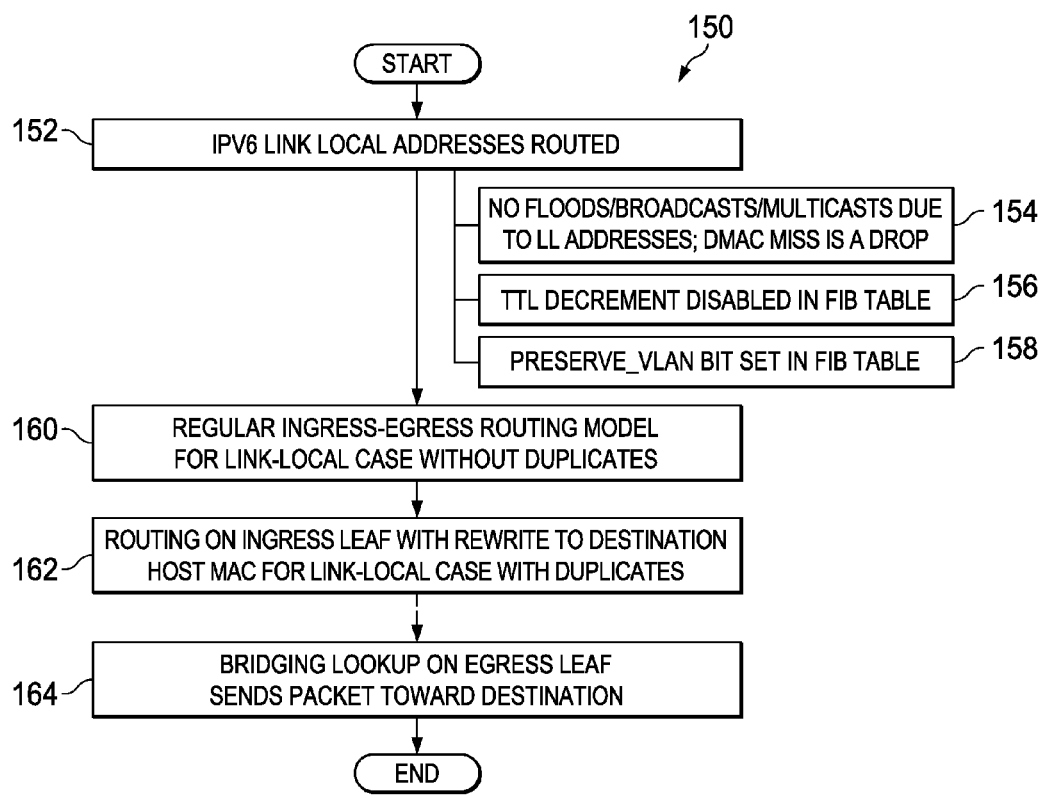
FIG. 9 is a simplified flow diagram illustrating yet potential operations that may be associated with an embodiment of the communication system.

Turning to FIG. 9, FIG. 9 is a simplified flow diagram illustrating example operations 150 that may be associated with embodiments of communication system 10. At 152, the IPv6 link-local addresses may be routed. Operation 152 can include, for example, 154, at which no floods or multicasts or broadcasts may be used for learning the link-local addresses. A Layer 2 hash table lookup miss may result in a dropped packet in some embodiments. Operation 152 can also include, for example, 156, at which TTL decrement may be disabled in the Layer 3 forwarding table (e.g., 22). Operation 152 can also include, for example, 158, at which the PV bit (e.g., 36) may be set (e.g., to 1) in the Layer 3 forwarding table (e.g., 22).

Operations 150 can further include 160, at which regular ingress-egress routing model (e.g., Layer 3 forwarding) may be implemented for link-local cases (e.g., wherein packets are destined to IPv6 link-local addresses rather than global IP addresses) without duplicates (e.g., in a specific VRF instance). At 162, the operation may include routing on the ingress leaf switch with rewrite to the destination host MAC address for link-local cases with duplicate IPv6 link-local addresses in a specific VRF instance. The routing at the ingress leaf switch may result in packet rewrite to the destination leaf switch MAC address. Operation 162 can include 164, at which bridging may be employed on the egress leaf switch that sends the packet towards its destination (e.g., to the remote leaf switch directly attached to the destination host).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, leaf switches 14(1)-14(2) and link-local module 18. In some embodiments, one or more of these features may be implemented in hardware, provided external to these elements, or consolidated in any appropriate manner to achieve the intended functionality. The various network elements (e.g., leaf switches 14(1)-14(2)) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 34) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 33) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
 receiving a packet at a first switch from a directly attached first host in a virtual local area network (VLAN) associated with a virtual routing and forwarding (VRF) instance of a network environment, wherein the packet is destined to an Internet Protocol version 6 (IPv6) link-local address of a remote second host in the VLAN, the IPv6 link-local address being unique within only the VLAN;

installing a destination value in a destination Media Access Control (MAC) address field of a Layer 3 forwarding table in the first switch;
setting an egress VLAN value in the Layer 3 forwarding table to the VLAN based on a value of a preserve-VLAN (PV) bit, wherein the PV bit is set to a value of 1 for link-local addresses, wherein the value of 1 for the PV bit indicates that an egress VLAN determined by the first switch and represented by the egress VLAN value is the same as the VLAN; and
routing the packet at Layer 3 to a second switch, to which the second host is directly attached, wherein if the VRF does not include duplicate IPv6 link-local addresses corresponding to the IPv6 link-local address of the second host, the destination value comprises a router MAC address of the second switch and the second switch routes the packet at Layer 3 to the second host, and wherein if the VRF includes at least one duplicate IPv6 link-local address corresponding to the IPv6 link-local address of the second host, the destination value comprises a MAC address of the second host and the second switch bridges the packet at Layer 2 to the second host.

2. The method of claim 1, wherein the IPv6 link-local addresses of hosts attached to the first switch are installed in the Layer 3 forwarding table, wherein the IPv6 link-local addresses of hosts remote from the first switch are installed conversationally in the Layer 3 forwarding table.

3. The method of claim 2, wherein entries in the Layer 3 forwarding table corresponding to inactive flows are aged out.

4. The method of claim 1, further comprising:
determining an egress port of the first switch from a look up of a Layer 2 hash table based on the egress VLAN and the destination MAC address field of the Layer 3 forwarding table; and
forwarding the packet through the egress port.

5. The method of claim 1, further comprising:
looking up a host database in the first switch for the IPv6 link-local address of the second host, wherein the host database comprises IPv6 link-local addresses of hosts associated with the VRF instance, wherein the host database is populated based on information received from hosts attached to the first switch and from other switches in the network environment.

6. The method of claim 5, wherein the host database includes the VRF instance, the IPv6 link-local addresses of hosts associated with the VRF instance, and VLANs associated with respective IPv6 link-local addresses.

7. The method of claim 1, further comprising:
trapping a Neighbor Solicitation (NS) message from the first host, wherein the NS message indicates a second IPv6 link-local address of the first host, wherein the NS message requests a MAC address corresponding to the IPv6 link-local address of the second host; and
advertising the second IPv6 link-local address and the VLAN to other switches in the network environment.

8. The method of claim 7, further comprising:
responding to the NS message with a Neighbor Advertisement (NA) message including a router MAC address of the first switch.

9. One or more non-transitory tangible media that includes instructions for execution, which when executed by a processor, is operable to perform operations comprising:
receiving a packet at a first switch from a directly attached first host in a virtual local area network (VLAN) associated with a virtual routing and forwarding (VRF) instance of a network environment, wherein the packet is destined to an Internet Protocol version 6 (IPv6) link-local address of a remote second host in the VLAN, the IPv6 link-local address being unique within only the VLAN;
installing a destination value in a destination Media Access Control (MAC) address field of a Layer 3 forwarding table in the first switch;
setting an egress VLAN value in the Layer 3 forwarding table to the VLAN based on a value of a preserve-VLAN (PV) bit, wherein the PV bit is set to a value of 1 for link-local addresses, wherein the value of 1 for the PV bit indicates that an egress VLAN determined by the first switch and represented by the egress VLAN value is the same as the VLAN; and
routing the packet at Layer 3 to a second switch, to which the second host is directly attached, wherein if the VRF does not include duplicate IPv6 link-local addresses corresponding to the IPv6 link-local address of the second host, the destination value comprises a router MAC address of the second switch and the second switch routes the packet at Layer 3 to the second host, and wherein if the VRF includes at least one duplicate IPv6 link-local address corresponding to the IPv6 link-local address of the second host, the destination value comprises a MAC address of the second host and the second switch bridges the packet at Layer 2 to the second host.

10. An apparatus, comprising:
a memory element for storing data; and
a processor that executes instructions associated with the data, wherein the processor and the memory element cooperate such that the apparatus is configured for:
receiving a packet at a first switch from a directly attached first host in a virtual local area network (VLAN) associated with a virtual routing and forwarding (VRF) instance of a network environment, wherein the packet is destined to an Internet Protocol version 6 (IPv6) link-local address of a remote second host in the VLAN, the IPv6 link-local address being unique within only the VLAN;
installing a destination value in a destination Media Access Control (MAC) address field of a Layer 3 forwarding table in the first switch;
setting an egress VLAN value in the Layer 3 forwarding table to the VLAN based on a value of a preserve-VLAN (PV) bit, wherein the PV bit is set to a value of 1 for link-local addresses, wherein the value of 1 for the PV bit indicates that an egress VLAN determined by the first switch and represented by the egress VLAN value is the same as the VLAN; and
routing the packet at Layer 3 to a second switch, to which the second host is directly attached, wherein if the VRF does not include duplicate IPv6 link-local addresses corresponding to the IPv6 link-local address of the second host, the destination value comprises a router MAC address of the second switch and the second switch routes the packet at Layer 3 to the second host, and wherein if the VRF includes at least one duplicate IPv6 link-local address corresponding to the IPv6 link-local address of the second host, the destination value comprises a MAC address of the second host and the second switch bridges the packet at Layer 2 to the second host.

11. The method of claim 1, further comprising further comprising disabling a time-to-live (TTL) decrement of the packet.

12. The media of claim 9, wherein the IPv6 link-local addresses of hosts attached to the first switch are installed in the Layer 3 forwarding table, wherein the IPv6 link-local addresses of hosts remote from the first switch are installed conversationally in the Layer 3 forwarding table.

13. The media of claim 9, wherein entries in the Layer 3 forwarding table corresponding to inactive flows are aged out.

14. The media of claim 9, wherein the operations further comprise:
   determining an egress port of the first switch from a look up of a Layer 2 hash table based on the egress VLAN and the destination MAC address field of the Layer 3 forwarding table; and
   forwarding the packet through the egress port.

15. The media of claim 9, wherein the operations further comprise looking up a host database in the first switch for the IPv6 link-local address of the second host, wherein the host database comprises IPv6 link-local addresses of hosts associated with the VRF instance, wherein the host database is populated based on information received from hosts attached to the first switch and from other switches in the network environment.

16. The media of claim 15, wherein the host database includes the VRF instance, the IPv6 link-local addresses of hosts associated with the VRF instance, and VLANs associated with respective IPv6 link-local addresses.

17. The apparatus of claim 10, wherein the IPv6 link-local addresses of hosts attached to the first switch are installed in the Layer 3 forwarding table, wherein the IPv6 link-local addresses of hosts remote from the first switch are installed conversationally in the Layer 3 forwarding table.

18. The apparatus of claim 17, wherein entries in the Layer 3 forwarding table corresponding to inactive flows are aged out.

19. The apparatus of claim 10, further configured for:
   determining an egress port of the first switch from a look up of a Layer 2 hash table based on the egress VLAN and the destination MAC address field of the Layer 3 forwarding table; and
   forwarding the packet through the egress port.

20. The apparatus of claim 10, further configured for looking up a host database in the first switch for the IPv6 link-local address of the second host, wherein the host database comprises IPv6 link-local addresses of hosts associated with the VRF instance, wherein the host database is populated based on information received from hosts attached to the first switch and from other switches in the network environment.

\* \* \* \* \*